(12) United States Patent
Kaur et al.

(10) Patent No.: US 12,360,960 B2
(45) Date of Patent: Jul. 15, 2025

(54) HEAT SCORE-BASED TIERING OF DATA BETWEEN DIFFERENT STORAGE TIERS OF A FILE SYSTEM

(71) Applicant: Dell Products L.P., Round Rock, TX (US)

(72) Inventors: Simarjot Kaur, Redmond, WA (US); Max Laier, Seattle, WA (US); Dhanashri Parasharam Patil, Lynnwood, WA (US); Mayank Rajawat, Issaquah, WA (US); Anton Rang, Houlton, WI (US); Chris Stacey, Seattle, WA (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/153,146

(22) Filed: Jan. 11, 2023

(65) Prior Publication Data

US 2024/0232140 A1 Jul. 11, 2024

(51) Int. Cl.
*G06F 16/185* (2019.01)
(52) U.S. Cl.
CPC .................. *G06F 16/185* (2019.01)
(58) Field of Classification Search
None
See application file for complete search history.

(56) References Cited

U.S. PATENT DOCUMENTS

| | | | | |
|---|---|---|---|---|
| 8,352,429 | B1* | 1/2013 | Mamidi | G06F 16/2282 707/642 |
| 8,954,381 | B1* | 2/2015 | Naamad | G06F 3/0685 707/609 |
| 2008/0027905 | A1* | 1/2008 | Jensen | G06F 3/0644 |
| 2008/0091638 | A1* | 4/2008 | Suzuki | G06F 3/0649 |
| 2011/0106863 | A1* | 5/2011 | Mamidi | G06F 16/185 707/823 |
| 2011/0282830 | A1* | 11/2011 | Malige | G06F 16/2282 707/E17.005 |
| 2013/0013850 | A1* | 1/2013 | Baderdinni | G06F 3/0647 711/E12.016 |
| 2015/0095282 | A1* | 4/2015 | Jones | H04L 67/1008 707/624 |
| 2015/0339319 | A1* | 11/2015 | Malina | G06F 3/0605 707/737 |
| 2018/0136838 | A1* | 5/2018 | White | G06F 3/0647 |

(Continued)

*Primary Examiner* — Augustine K. Obisesan
(74) *Attorney, Agent, or Firm* — Amin, Turocy & Watson, LLP

(57) ABSTRACT

The described technology is generally directed towards maintaining a heat score per file based on a file's access/activity level, and using the heat score to re-tier files from faster to slower storage and vice-versa. Files on a slower tier that have more activity are thereby moved ("up-tiered") to a faster access storage tier, while the files that have less activity on the faster access storage tier are moved ("down-tiered") to a slower access storage tier. The heat score for a file is increased based on more input-output operation activity, and decayed over time. The decaying can be based on a relative importance value (e.g., business value) assigned to the file or a domain that includes the file. Ordering the files based on their respective heat scores allows only a fraction of the files to be considered for re-tiering before the re-tiering moves are performed.

20 Claims, 10 Drawing Sheets

(56) References Cited

U.S. PATENT DOCUMENTS

| | | | |
|---|---|---|---|
| 2018/0136874 A1* | 5/2018 | Karve | G06F 3/0685 |
| 2019/0102259 A1* | 4/2019 | Oberhofer | G06F 3/0683 |
| 2019/0243559 A1* | 8/2019 | Raut | G06F 3/0604 |
| 2019/0347338 A1* | 11/2019 | Mani | G06F 16/178 |
| 2021/0342084 A1* | 11/2021 | Ng | G06F 3/061 |
| 2022/0091738 A1* | 3/2022 | Patil | G06F 3/0647 |
| 2022/0283956 A1* | 9/2022 | Carpenter | G06F 12/122 |
| 2022/0318191 A1* | 10/2022 | Zumach | G06F 16/13 |

* cited by examiner

HEAT SCORE-BASED TIERING OF DATA BETWEEN DIFFERENT STORAGE TIERS OF A FILE SYSTEM

TECHNICAL FIELD

The subject application relates generally to data storage, and, for example, to a technology that manages the moving of data between different tiers of storage, and related embodiments.

BACKGROUND

In general, fast storage for data is relatively more expensive than slower, archival storage. As a result, contemporary (e.g., enterprise class) data storage systems have multilevel tiers of storage so that files that are more likely to be accessed are maintained in faster, generally smaller capacity storage than those files that are less likely to be needed. However, typical re-tiering implementations to move files from one tier to another suffer from several issues, including the need for laborious system administrator oversight and planning to keep such implementations functional.

For example, a typical way of determining whether a file is likely to be needed is to check the file's past access or modification timestamps. However, this is unreliable and does not consider the file's access patterns. Further, when dealing with a large number of files, finding and sampling them for purposes of re-tiering is a slow, resource-intensive process. Still further, during re-tiering operations, moving a file from one tier to another may change the utilization level of a tier, which can contradict the original purpose of the move.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
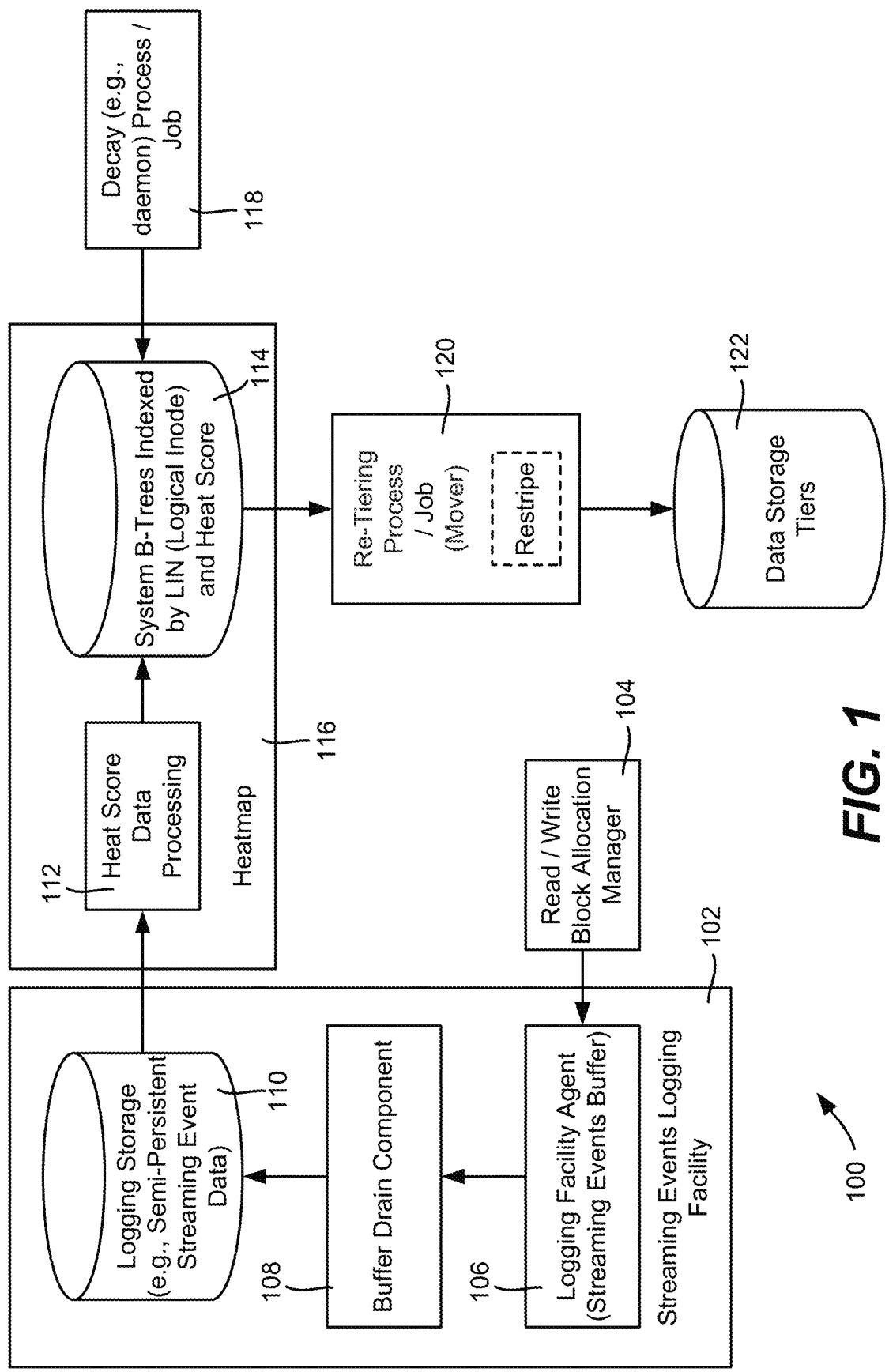
FIG. 1 is a block diagram representation of an example system/architecture that facilitates re-tiering of data, in accordance with various aspects and implementations of the subject disclosure.

Various aspects of the technology described herein are generally directed towards automatically tiering data, e.g., maintained in files, by maintaining a "heat score" per file based on file activity (e.g., input-output operation) data, such as comprising access level information. In general, the technology described herein is based on ranking the files in the storage system using the files' relative heat scores. The data files are ordered relative to one another as described herein so as to execute only beneficial moves between data tiers.

One of the tiers described herein is referred to as a "hot" tier, which generally refers to a faster storage tier relative to other storage tier(s); the hot tier is typically smaller in storage capacity and relatively more expensive per storage unit (e.g., per byte) than other tier(s). A "cold tier" refers to a secondary storage tier relative to the hot tier, and which is typically larger, slower and less expensive than the hot tier.

As will be understood, the technology described herein performs re-tiering of data between tiers, such as from the hot tier to the cold tier, and vice versa. In general, "up-tiering" refers to moving the location of a file from a slower storage tier to a faster tier (which is likely more expensive but smaller than the slow tier), while "down-tiering" refers to the movement of a file's location in the opposite direction.

A desired "watermark" provides an ideal utilization level for a given tier. A "preferred" tier refers to a tier that the user/system prefers or desires to achieve the watermark first, in case watermarks for more than one tier cannot be met (because of too much data or not enough data). Typically the preferred tier is the hot tier, which a user may want to be filled to the desired limit in comparison to the cold tier.

A relative importance value, provided by the user for a given dataset or subset of the dataset (e.g., any grouping of data, such as a directory, but possibly as little as per file), can be referred to as a "business value" in some example implementations. In one implementation, the heat score is "decayed" over time based on its relative importance value (e.g., business value). In general, the higher the business value, the slower the decay (heat score reduction). Thus, a file with higher business value decays more slowly (that is, tends to stay "hot" for a longer time) and consequently is more likely to stay on the hot tier or be selected to be up-tiered to the hot tier, even if relatively infrequently accessed compared to a file with a lower relative importance value. A file with a lower business value decays more quickly and/or tends to stay "colder" for a longer time and is thus more likely to stay on the cold tier, or be selected for being down-tiered from the hot tier to the colder tier during a re-tiering operation as described herein.

It should be understood that any examples or descriptions herein are only non-limiting examples for the purpose of explanation. As one particular example, as used herein a "file" refers to any structure of data, whether a file in the conventional file system sense or some other grouping of data accessible via any suitable metadata, including storage location and size. As another example, re-tiering files from a hot storage tier to a cold storage tier is described; however it is understood that more than two tiers can be present in a given storage system, for example to perform re-tiering between a hot (fastest to access data) storage tier and a first cold storage tier that is slower with respect to data access than the hot tier, between the first cold storage tier and a second cold storage tier that is slower than the first cold storage tier, and so on for any practical number of pairs of storage tiers. Thus, any of the embodiments, aspects, concepts, structures, functionalities or examples described herein are non-limiting, and the technology may be used in various ways that provide benefits and advantages in computing and data storage in general.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows an example architecture/data storage system 100 that includes a number of example components that facilitate intelligent re-tiering of data between different storage tiers, such as from the hot tier to a cold tier, and the cold tier to the hot tier. The re-tiering between both tiers can be in conjunction with one another, e.g., in parallel or substantially in parallel.

In FIG. 1, a logging facility 102 provides an API or the like to record operations to files, e.g., provided via a read/write block allocation manager 104. The logging facility 102 can be of a type that records streaming events, e.g., a streaming events logging facility, such as to log event data including file identification data (e.g., an inode number), access time, access type (read/write/metadata only), the file's domain and its declared business value. Other data may be part of the logged information/event. In one implementation, the logging facility 102 basically allows an event to log itself; further, an API allows a consumer, such as a process, to read these events.

With respect to recording file operations, a logging facility agent 106, incorporated into or otherwise coupled to the logging facility 102 includes a buffer (e.g., an in-memory circular streaming events buffer) that stores a sufficient number of file-related I/O entries. This can be weighted based on cache hits or misses. A buffer drain component 108, e.g., of a network attached storage platform, periodically (or otherwise) drains the buffer to persistent storage/semi-persistent storage 110 (e.g., an on-disk circular buffer of a relatively larger capacity) with relatively very low processing. Note that with a finite amount of bounded space usage/streaming event data storage, newer events replace older events over time, however in general the older events are processed as described herein before they are evicted.

The events are consumed by a heat score data processing component 112 into a system B-tree 114 or other suitable storage, which can be considered part of a heatmap component 116. With a streaming event storage system, the heat score data processing component 112 processes raw events (e.g., obtained via a streaming events logging facility API) and computes the per file heat scores of the files having IO activity logged as event data. In one implementation, the system B-tree 114 comprises a logical inode number (LIN)-indexed tree data structure that stores relevant metadata for each file.

For example, the heat score data processing component 112 can be a heatmap daemon that reads via the API and converts the raw data to consumable information. The heatmap 116 thus can be a layer that produces a LIN index to store historical data indexed by LIN, the heat score data comprising a heatmap to store per-tier LINs ranked and indexed by their heat score plus business value, or indexed by heat rank. The heatmap 116 can also maintain per-dataset latency information, e.g., for reporting.

With respect to building heat scores from file operation logs, the heat score is calculated by adding values representative of the various file-operations in a weighted manner. The new heat score for a file is combined with the file's previous heat score to arrive at a heat score that reflects historical as well as recent operations.

The heat score of a file can be calculated based on the number of current operations (e.g., read, write), assigned relative importance value, and the past heat score for a given file. In one implementation, a relatively straightforward heat score formula calculates the heat score by summing (or otherwise mathematically combining) the input-output (IO) operations for a file in a current time period, in conjunction with (e.g., followed by) an evaluation of (e.g., a weighted average against) the existing/previous heat score of that file. In another implementation, more available information can be used, e.g., a heat score formula for a file can consider each type of IO (read, write, metadata-related operation), the size of each IO, and the latency of each IO for a file in a current time period, in conjunction with an evaluation of the existing/previous heat score of that file.

When heatmap is generated, a secondary index can be built to get a quick relative comparison of scores between files. This secondary index comprises the heat score, which is used as a key parameter to establish the ordering between files and define flow of direction between tiers. This score need not be just a combined heat score. In theory, multiple secondary indices can be used to create ordering between files and then used to re-tier files. For example, read and write activities can be used to generate separate heat scores for read and write. And a given tier can have a separate up-tier/down-tier relationship based on the heat score; and a separate up-tier/down-tier relationship based on write heat score.

The heat scores can be used to create a global ordering of files, based on heat score. In one implementation, ordering is achieved by storing an amount of file metadata in a B-tree whose keys are ordered by the heat score. This provides a significant advantage, as only a relatively small portion of the files need be sampled to evaluate for tiering.

Turning to another aspect, the system 100 decays the heat score of files based on a lack of new events or relatively few events. To this end, a decay process 118 (e.g., a daemon or separate job such as run as a first phase of the overall re-tiering operation) updates the heat score for the indexed files in the B-trees 114 based on their respective previous heat scores, respective business values, decay style (e.g., linear/exponential/or the like as described herein) and time elapsed since last time the heat score was updated.

In general, the decay process 118 decays the heat scores of the entries present in the heatmap system B-tree 114, so that the files that are not accessed for some time have their heat scores decayed (rather than reflecting the heat score at prior access). For example, the decay process 118 can use the last heat score update time along with the business value of the domain to which the file belongs to determine the decay factor of the heat score. For performance, the decay process 118 can perform bulk tree operations, batching based on the read size (data block entries), bulk writes, avoiding unneeded closing and reopening operations, reusing keys when possible (e.g., for heat scores of zero), buffering, skipping processing of entries with near zero heat scores and so forth.

The administrator (or a process) can select a technique for managing the heat score, including how the heat score is to be decayed, e.g., exponential, linear, step and so on per dataset, e.g., per file domain, per file, per file importance score, and/or the like. A customized decaying formula can also be applied, possibly a combination of formulas, such as to perform linear heat score decay for some time, followed by exponential decay. The system can also include additional factors such as an amount of time the given file/directory is relevant to the user.

Managing the heat score can also (or alternatively) include or be based on artificial intelligence (AI)/machine learning (ML), where machine learning can recognize access trends, for example. Such a tool is fed the input-output pattern data, and may decide to raise or leave intact the current heat score instead of always lowering it in absence of input-output operations. For example, an application that runs periodically can benefit from this AI/ML by raising the heat score in anticipation of upcoming input-output operations, resulting in moving the datafiles to the fast tier in advance of their actual need.

Instead of directly changing the heat score, an ML model can use access history as input parameters, and based on the access history, predict and insert upcoming events into the event stream. This allows other (e.g., tested and verified) heat score calculation and decay logic to stay unchanged.

With respect to re-tiering, a job engine or other re-tiering process (block 120) can be configured to perform small, bounded re-tiering tasks quickly. For example, a single phase job can execute the up-tiering/down-tiering of the files/LINs. In general, the process 120 re-tiers files to move to an appropriate tier based on activity level of files and tier (pool) utilization levels. Note that for appropriate data storage systems, re-tiering can include restriping the data among different physical storage devices.

The re-tiering process 120 operates to keep the data store tiers 122, and typically the hot, high-performance tier, to a desired level of utilization as specified by the administrator or default, that is close to the tier's "high" watermark. The re-tiering process 120 attempts to perform its operations with low (e.g., minimal) reading of inodes (or taking file locks) during pre-processing of data, and can operate to avoid frequent "ping-ponging" of files between the higher performance tier and the slower/colder tier while attaining desired tiering, as described herein. Moreover, the re-tiering process 120 determines the inode set to be re-tiered (re-striped) by examining only the relevant fraction of inodes in the system B-trees as opposed to the entire inode table; this is done by narrowing down the overlap zone, which represents the part of the heat score index between the coldest file in the hot tier and the hottest file in the cold tier, and keeping track of the hottest/coldest inodes on each tier.

Figure 2:
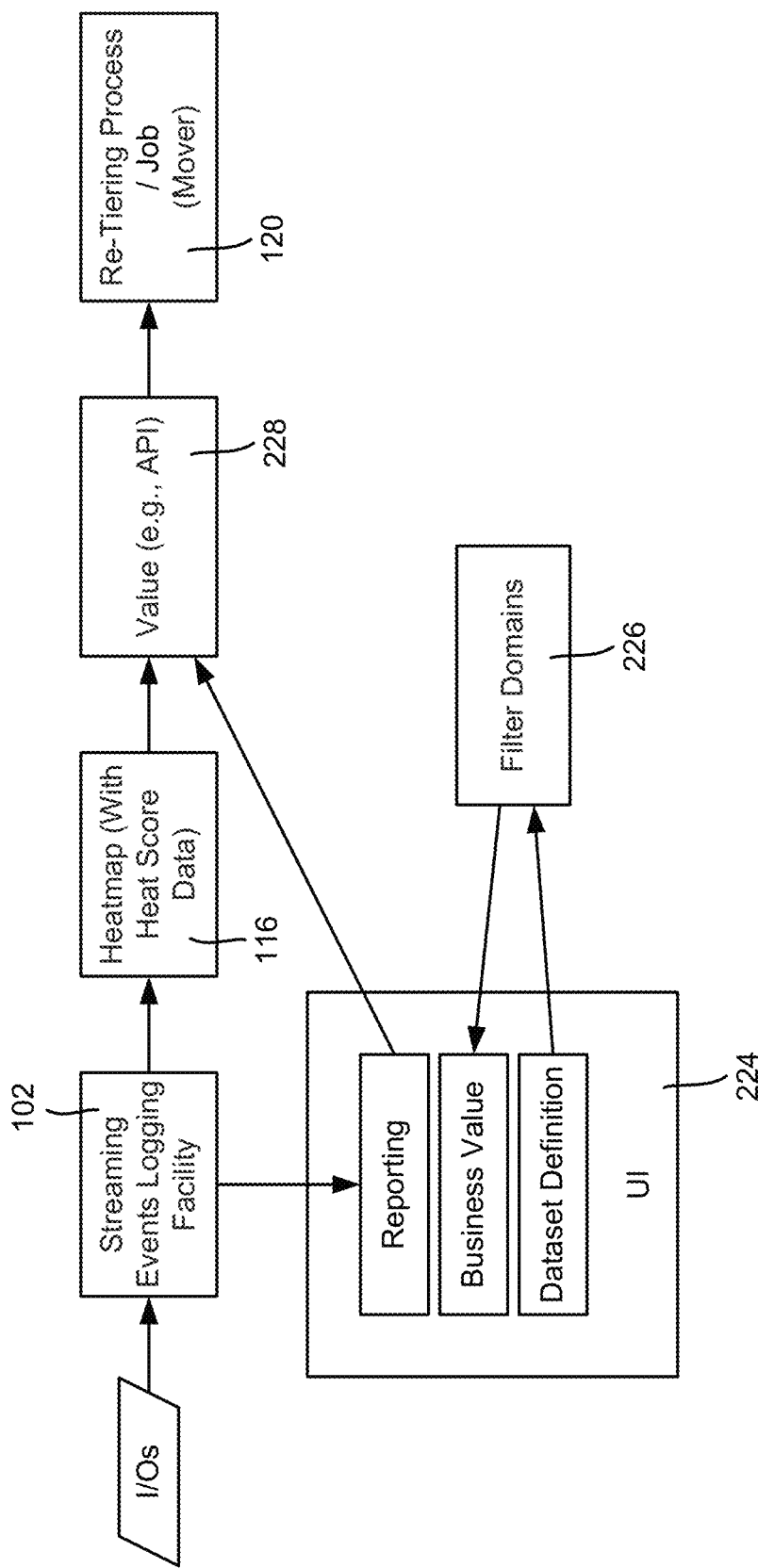
FIG. 2 is a block diagram representation of example components including a user interface that provides an administrator with various parameter selection options, in accordance with various aspects and implementations of the subject disclosure.

Turning to FIG. 2, a user interface 224 allows an administrator (or the like, e.g., an automated process, default values and so forth) to identify and define datasets as filter domains 226, and assign business values to them. Filter domains refer to any arbitrary grouping of files, instead of being limited to hierarchical groupings. The administrator can optionally specify how the heat score against a given dataset is managed, including the technique used to adjust (e.g., decay over time) the heat score of a file.

The user interface 224 allows the administrator (or a process) to select a technique for managing the heat score, including how the heat score is to be decayed, e.g., exponential, linear, step and so on per dataset, e.g., per file domain, per file, per file importance score, and/or the like. A customized decaying formula can also be applied, possibly a combination of formulas, such as linear decay for some time, followed by exponential decay.

Managing of the heat score can also (or alternatively) include or be based on artificial intelligence (AI)/machine learning (ML), where machine learning can recognize access trends, for example. Such a tool is fed the input-output pattern data, and may decide to raise or leave intact the current heat score instead of always lowering it in absence of input-output operations. For example, an application that runs periodically can benefit from this AI/ML by raising the heat score in anticipation of upcoming input-output operations, resulting in moving the datafiles to the fast tier in advance of their actual need.

Instead of directly changing the heat score, an ML model that uses access history as input parameters and based on the access history, predicts and inserts upcoming events into the event stream. This allows the other (e.g., tested and verified) heat score calculation and decay logic to stay unchanged.

A value API 228 tells the calling entity which files need moving; in general, the value API 228 provides a short list of files to move from the current tier to another tier. The decision is based on the usage of tiers (too full, too empty) and the higher tier's lower ranked files versus the lower tier's higher ranked files.

Figure 3:
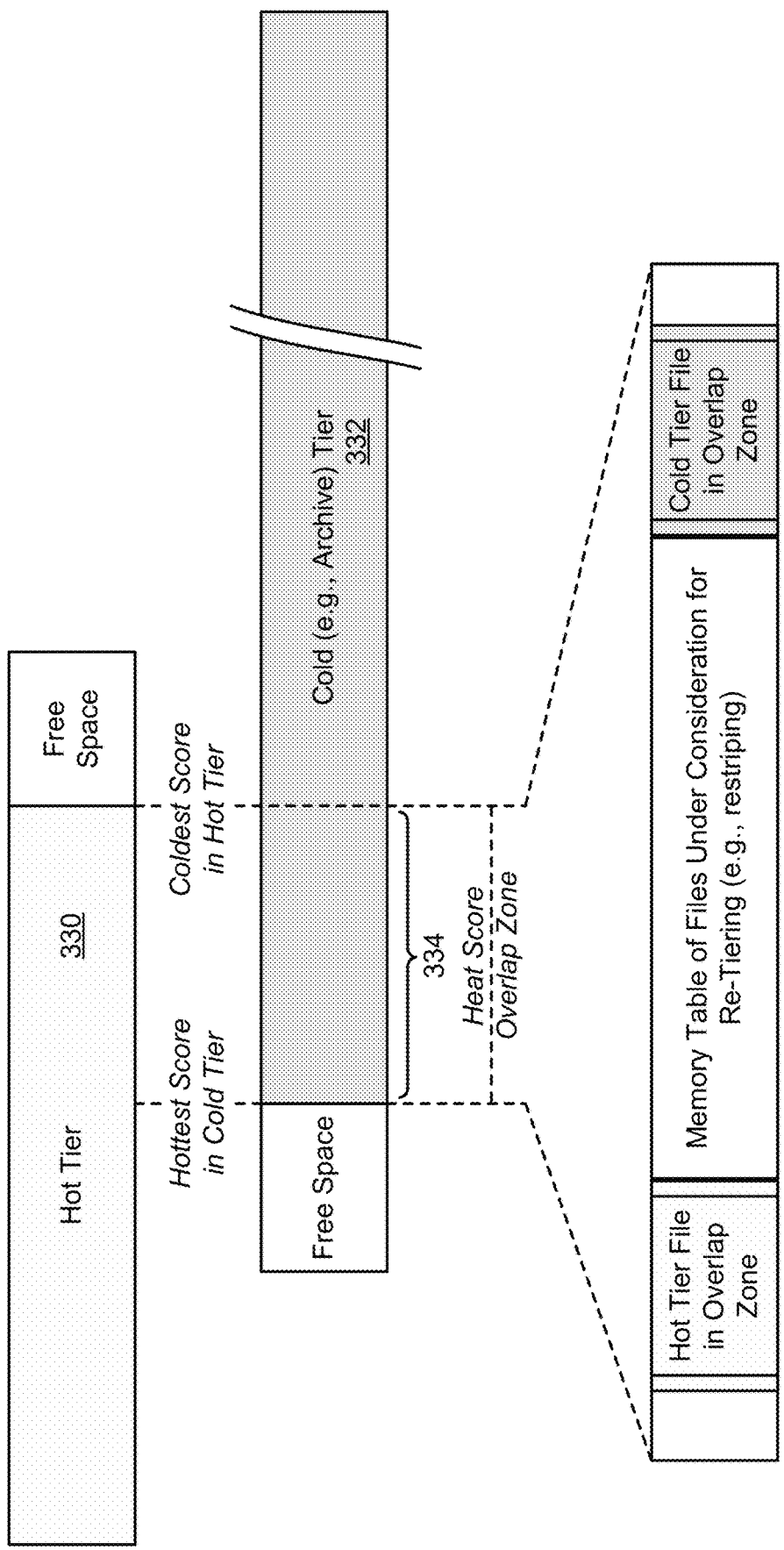
FIG. 3 is an example representation of hot and cold storage tiers and an associated overlap zone, in accordance with various aspects and implementations of the subject disclosure.

FIG. 3 shows a logical view of the data, including the hot tier 330, and the cold tier 332. As described herein, the heat score overlap zone 334 represents the part of the heat score index between the coldest file in the hot tier 330 and the hottest file in the cold tier 332. The files in the overlap zone are considered for re-tiering. Note however that re-tiering can go beyond the overlap zone if one of the fill limits is not yet reached. Not explicitly shown are a hot high-water mark (corresponding to a hot fill limit), which represents the highest percentage of utilization desired for the hot tier (e.g. 75%), and the cold high-water mark (corresponding to a cold fill limit), which represents the highest percentage of utilization desired for the cold tier (e.g. 95%). A precision margin can be used as a variable to indicate the number of blocks (or percentage points) that the system is allowed to deviate from the water mark, (e.g.: 2%, although a separate high precision margin and low precision margin value can be declared). Range markers denote the hottest overlapping point in the cold tier and the coldest overlapping point in the hot tier; these ranges can be extended in the event the overlap zone is not sufficient to meet the move targets. Percentage points for the hottest file/block in the cold tier and coldest file/block in the hot tier can be determined from the heat score index using a binary search.

In general, the re-tiering process operates to calculate the up-tiering blocks needed relative to the current usage, that is, the number of blocks needed to reach the preferred tier's (e.g., hot) high water mark based on the hot high-water mark, hot fill limit and cold fill limit parameters. The other (e.g., cold) tier blocks are similarly determined. As can be readily appreciated, the number of currently hot blocks to be down-tiered to the cold tier and the number of the currently cold blocks to be up-tiered to the hot tier are balanced against each other.

The re-tiering process thus re-tiers by consuming the heat score index and achieve (possibly conflicting) goals. The re-tiering process efficiently identifies the interesting subset of files to re-tier. The re-tiering process can perform mock moves of the files to project how tiers will look after exchanging the subset of hot and cold files in opposite tiers, and once the projection is acceptable, performs the actual moves in a parallel manner. Re-tiering is extendable to multiple tiers by comparing two tiers at a time.

In order to avoid tracking files that have not been accessed for a long time (e.g., "archived" or "cold" files), files with a small or zero heat score can be dropped from the indices after moving them to the coldest tier in the system. Doing so avoids spending resources with respect to tracking and processing this category of files, as there is no need to periodically decay them once they have been moved to the coldest tier. If there later is activity on any of these files, a new heat score can be calculated for each active one based on its current IO operations, which can assume the previous heat score was zero (if not recorded in association with the file). There is still a need for an alternate way to discover this category of files, such as if the coldest tier is being modified in size or is not desirably filled. To this end, such files can be tracked in a separate index or otherwise marked so as to not be processed for decaying, ordering or tiering under normal processing.

Some files may have heat scores (e.g., due to input-output operations frequency or access patterns) that often fall in the range being considered for tiering. This may result in frequent bouncing of the file between two tiers. To avoid such a "ping pong" effect, a file that has been recently up-tiered or down-tiered may be declared by the system as ineligible for re-tiering within an administrator-specified interval of time, e.g., a day, a week or other timeframe, generally depending on a given system and workflows. This time can also be determined empirically based on the system or other process evaluating actual workflows and the like.

Turning to decay-based examples, as set forth herein, heat score management refers to adjusting heat score values for file heat scores. The heat score management be selected as exponential decay, a linear decay and so on (or managed by an AI/ML agent trained in the past access levels of the files in that dataset). An exponential decay results in a file that has not been accessed for a long period of time does not retain its heat score, as the heat score is reduced exponentially over time.

Business value-driven heat score management is based on using the business value specified by the administrator to affect how the heat scores are managed. For example, as graphically represented via the heat score versus time plots in FIG. 4, exponential decay can be slowed down for higher business value datasets and steep for low business value datasets. More particularly, in this example a user-provided customizable value (gold/silver/bronze) maps to a numerical business value, e.g., gold (=100), silver (=70) and bronze (=40). These straightforward administrator-assigned business values can be used, however as can be readily appreciated, any practical number of such categories with different business values can be used. In this example, hot, cold and frozen categories are also determined based on the frequency of periodic reads and writes on each of the files, e.g., files with the highest frequency of reads and writes are "hot," less frequent reads and writes are "cold" and no reads and writes after creation are "frozen" in FIG. 4.

Figure 4:
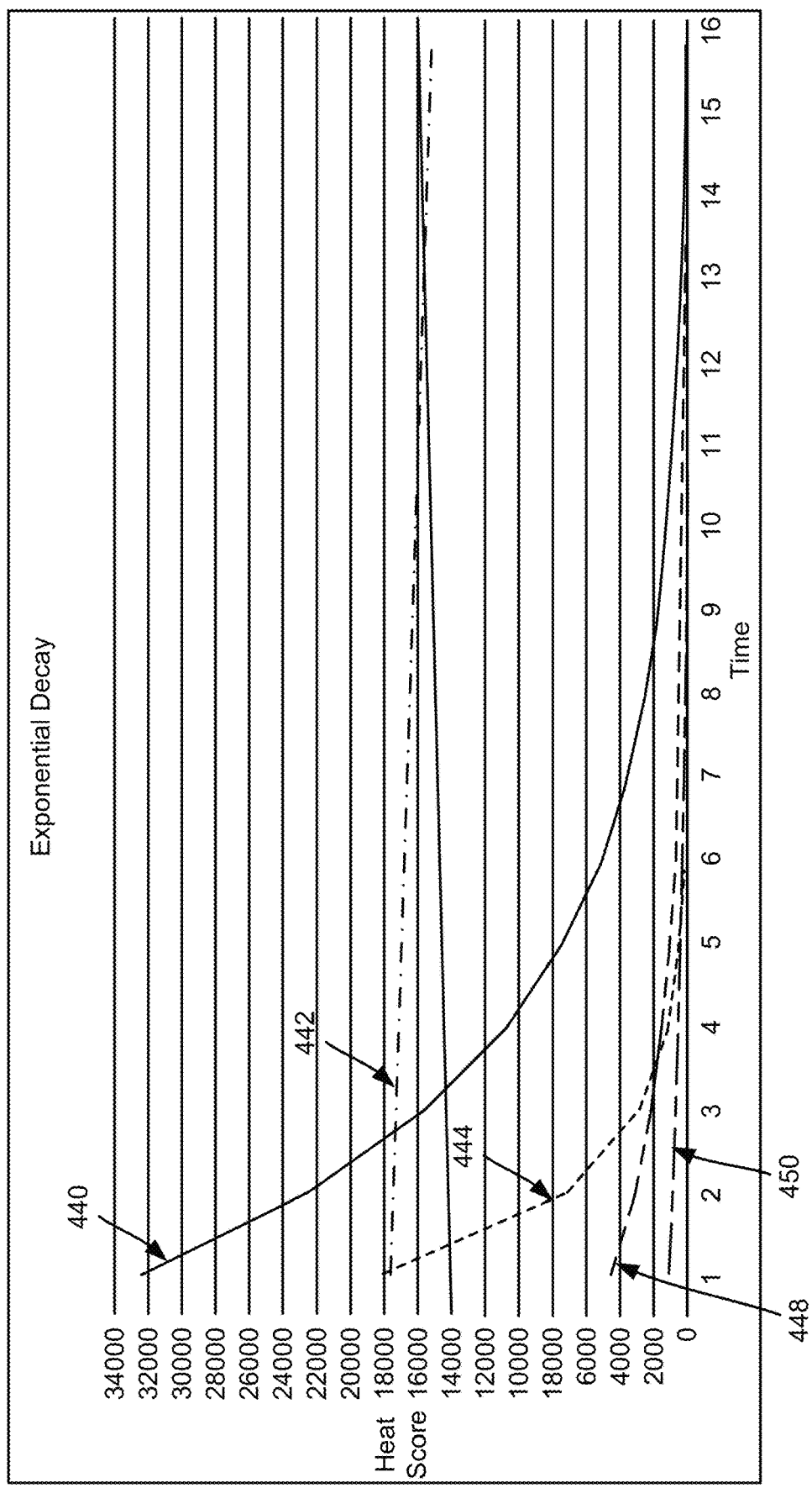
FIG. 4 is an example graphical representation of exponential heat score decay, in accordance with various aspects and implementations of the subject disclosure.

In FIG. 4, the exponential decay of "hot silver" file(s) is represented by the solid line 440, "cold gold" file decay is represented by the dashed/dotted line 442 and hot bronze file decay is represented by the dashed line 444. The dashed lines 448 and 450 represent the exponential decay of "cold silver" file(s) and frozen silver file(s), respectively.

Figure 5:
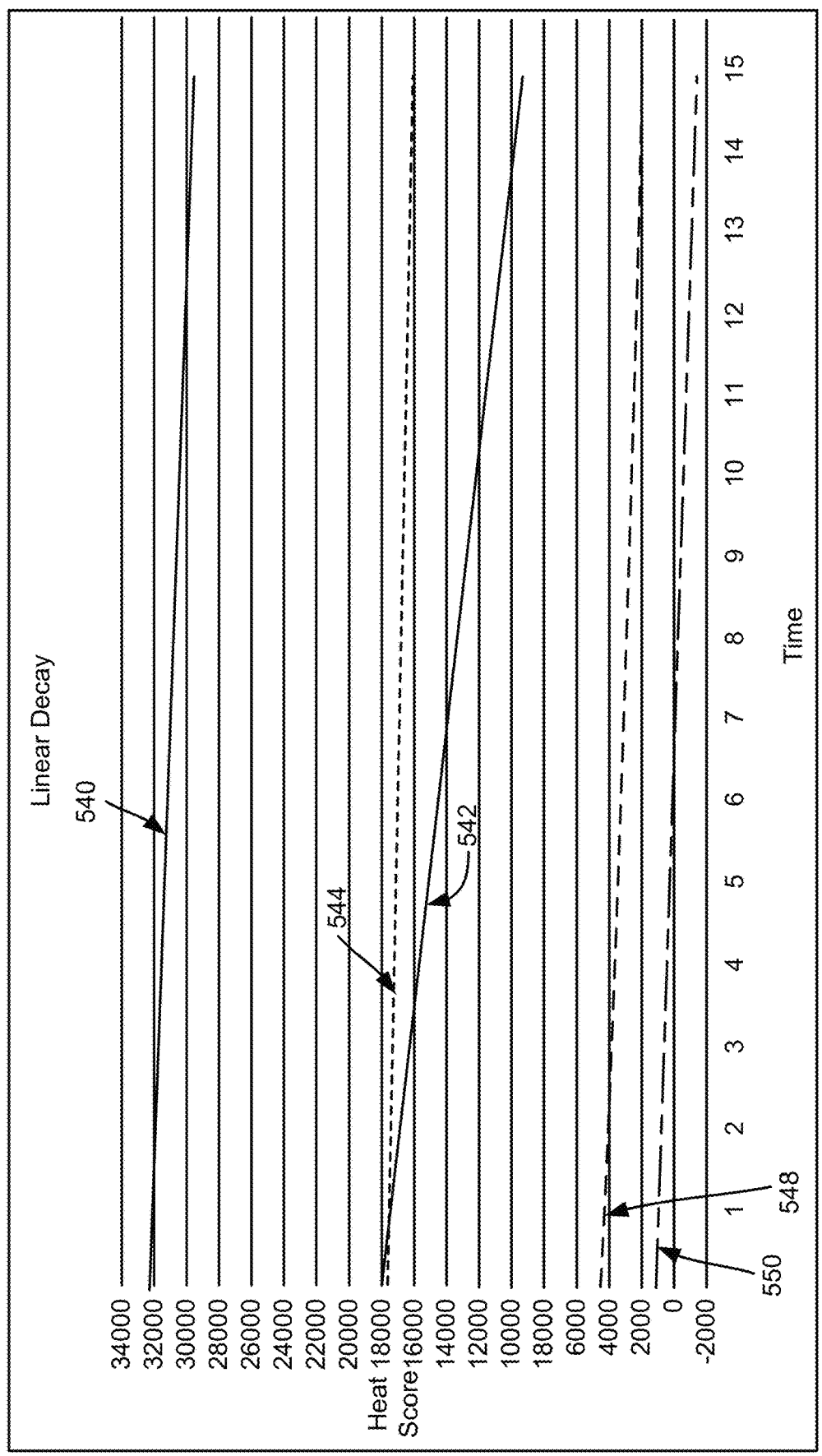
FIG. 5 is an example graphical representation of linear heat score decay, in accordance with various aspects and implementations of the subject disclosure.

FIG. 5 is similar to FIG. 4 except that linear decay, rather than exponential decay, is shown. Thus, in FIG. 5, the linear decay of "hot silver" file(s) is represented by the solid line 540, "cold gold" file decay is represented by the dashed/dotted line 542 and hot bronze file decay is represented by the dashed line 544. The dashed lines 548 and 550 represent the linear decay of "cold silver" file(s) and frozen silver file(s), respectively.

Figure 6:
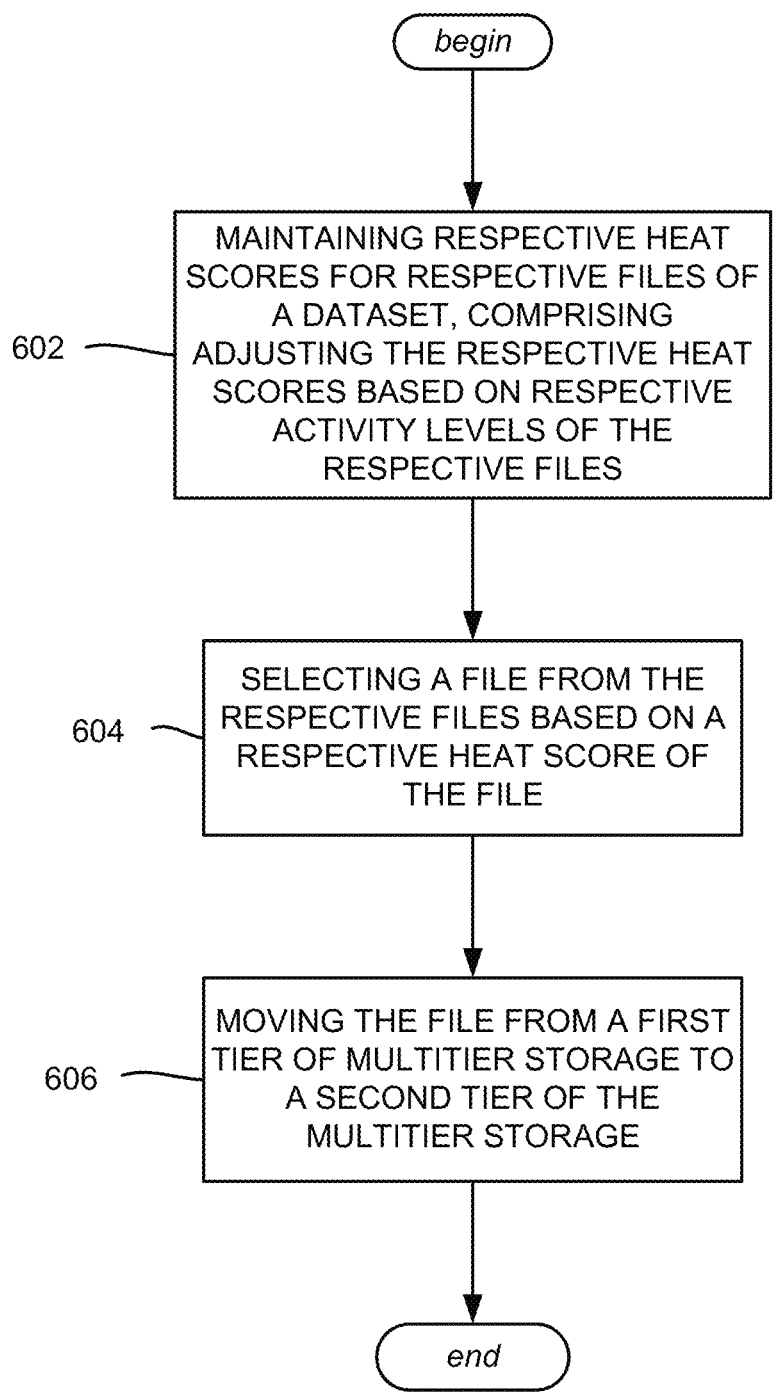
FIG. 6 is an example flow diagram showing example operations related to maintaining heat scores for files, selecting a file based on its heat score and moving the file to a different tier, in accordance with various aspects and implementations of the subject disclosure.

One or more aspects can be embodied in a system, such as represented in FIG. 6, and for example can comprise a memory that stores computer executable components and/or operations, and a processor that executes computer executable components and/or operations stored in the memory. Example operations can include operation 602, which represents maintaining respective heat scores for respective files of a dataset, comprising adjusting the respective heat scores based on respective activity levels of the respective files. Example operation 604 represents selecting a file from the respective files based on a respective heat score of the file. Example operation 606 represents moving the file from a first tier of multitier storage to a second tier of the multitier storage.

The first tier of the multitier storage can facilitate faster access to the file relative to the second tier.

Further operations can include obtaining respective relative importance level values of the respective files, and wherein the respective heat scores are further based on the respective relative importance level values. Adjusting the respective heat scores further can include decaying the respective heat scores over time. The decaying of the respective heat scores over time can include adjusting the respective heat scores based on at least one of: an exponential decaying function applied to at least one of the respective heat scores, a linear decaying function applied to at least one of the respective heat scores, a step decaying function applied to at least one of the respective heat scores, a customized decaying function applied to at least one of the respective heat scores, a machine learning model applied to at least one of the respective heat scores, or an artificial intelligence process applied to at least one of the respective heat scores.

Adjusting the respective heat scores can include determining respective input-output operations of the respective files over a time period relative to respective previous heat scores of the respective files.

Adjusting the respective heat scores can include determining at least one of: respective read operations corresponding to the respective files, respective write operations corresponding to the respective files, respective metadata access operations corresponding to the respective files, respective size data of respective input-output operations corresponding to the respective files, or respective latency data of the respective input-output operations.

Further operations can include, in response to the moving of the file, designating the file as ineligible for re-tiering within a specified interval of time.

Maintaining the respective heat scores can include updating a tree data structure.

Figure 7:
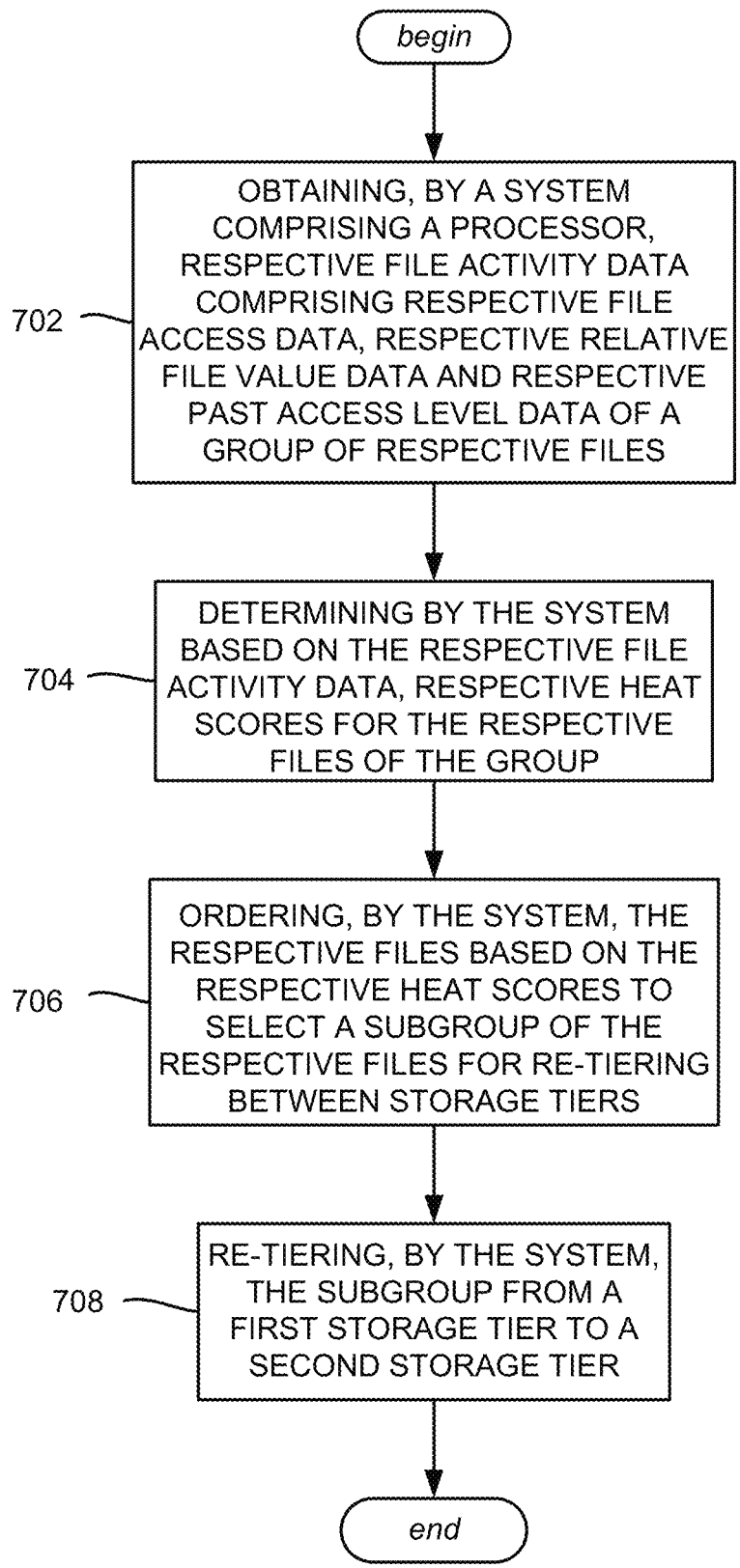
FIG. 7 is an example flow diagram showing example operations related to re-tiering files based on their activity data/heat scores, in accordance with various aspects and implementations of the subject disclosure.

One or more example aspects, such as corresponding to example operations of a method, are represented in FIG. 7. Example operation 702 represents obtaining, by a system comprising a processor, respective file activity data comprising respective file access data, respective relative file value data and respective past access level data of a group of respective files. Example operation 704 represents determining by the system based on the respective file activity data, respective heat scores for the respective files of the group. Example operation 706 represents ordering, by the system, the respective files based on the respective heat scores to select a subgroup of the respective files for re-tiering between storage tiers. Example operation 708 represents re-tiering, by the system, the subgroup from a first storage tier to a second storage tier.

Obtaining the respective file activity data can include tracking file-related operations.

Obtaining the respective file activity data can include accessing a file operation log.

Ordering the respective files can include storing respective file metadata in a B-tree comprising keys ordered by the respective heat scores.

Further operations can include decaying, by the system over time, the respective heat scores based on the respective relative file value data.

Further operations can include projecting, by the system, a first storage tier utilization level of the first storage tier and a second storage tier utilization level of the second storage tier prior to moving the subgroup.

The subgroup can be a first subgroup, and further operations can include moving, by the system, a second subgroup of files from the second storage tier to the first storage tier in conjunction with the moving of the first subgroup from the first storage tier to the second storage tier.

Figure 8:
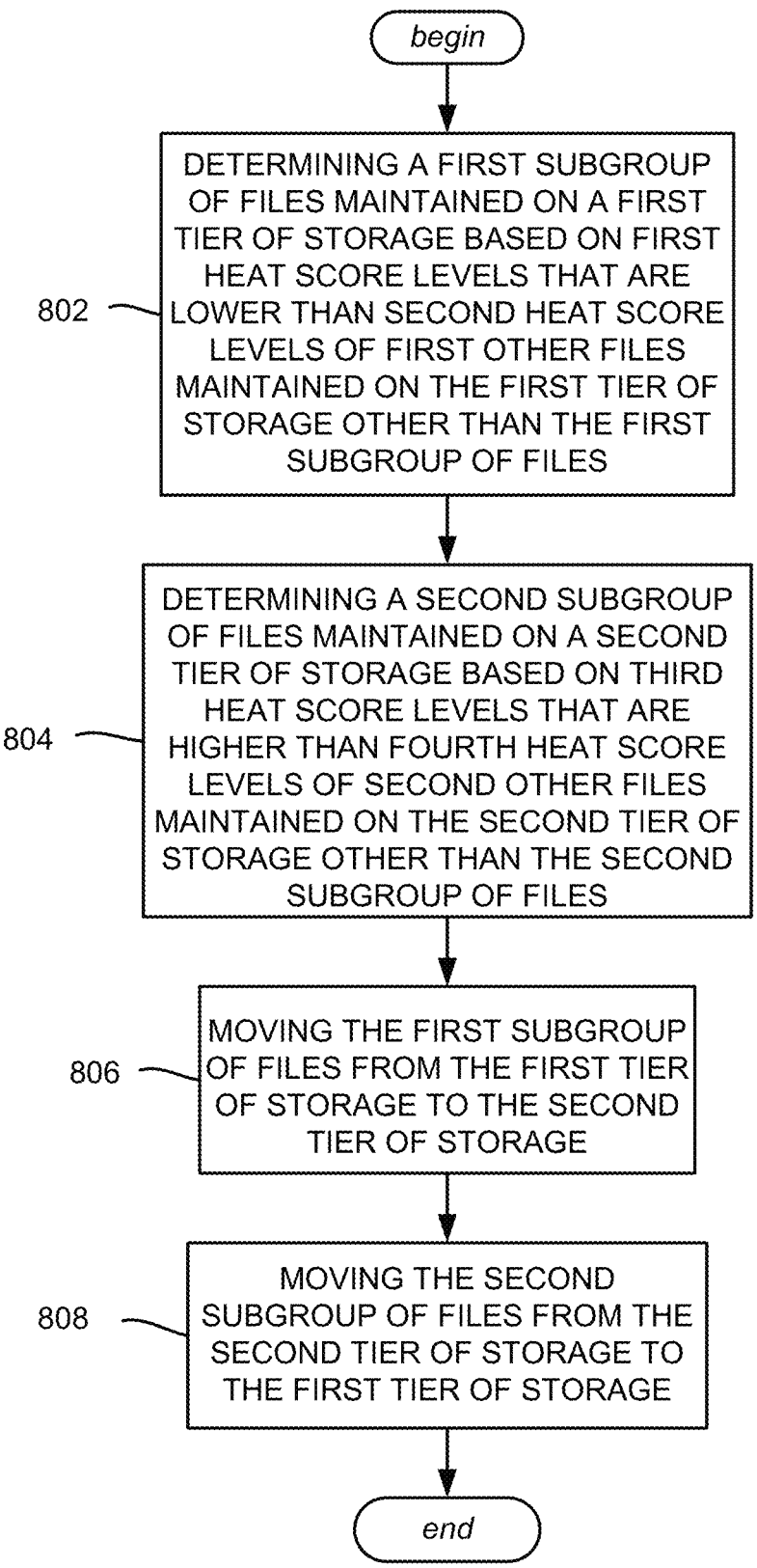
FIG. 8 is a flow diagram showing example operations related to moving files from a first tier to a second tier and moving other files from the second tier to a first tier, in accordance with various aspects and implementations of the subject disclosure.

FIG. 8 summarizes various example operations, e.g., corresponding to a machine-readable storage medium, comprising executable instructions that, when executed by a processor, facilitate performance of operations. Example operation 802 represents determining a first subgroup of files maintained on a first tier of storage based on first heat score levels that are lower than second heat score levels of first other files maintained on the first tier of storage other than the first subgroup of files. Example operation 804 represents determining a second subgroup of files maintained on a second tier of storage based on third heat score levels that are higher than fourth heat score levels of second other files maintained on the second tier of storage other than the second subgroup of files. Example operation 806 represents moving the first subgroup of files from the first tier of storage to the second tier of storage. Example operation 808 represents moving the second subgroup of files from the second tier of storage to the first tier of storage.

The first heat score levels of the first subgroup can include at least one of: a read operation heat score level, or a write operation heat score level.

Further operations can include, in response to the moving of the first subgroup of files from the first tier of storage to the second tier of storage, designating at least one file of the first subgroup of files as ineligible, during a specified time interval, for being moved from the second tier of storage back to the first tier of storage.

Further operations can include lowering, prior to the determining of the first subgroup of files, a heat score level of the first heat score levels applicable to a file of the first subgroup of files based on at least one of: an exponential decaying function, a linear decaying function, a step decaying function, a customized decaying function, machine learning, or artificial intelligence.

As can be seen, described herein is a technology that facilitates efficient automatic tiering of files, while keeping the most expensive tier(s) at high utilization (specified, desired) levels, in a way that reduces the complexity of managing tiers from a user. The activity level of files and utilization level of tiers determines the re-tiering of files among storage tiers, without the storage administrator needing to understand file access patterns.

The technology described herein compares files based on their activity levels corresponding to "heat scores," in contrast to files' last access times, which is not very reliable. Described is quick access to the coldest files in a hot tier and vice-versa, along with adjusting (decaying) the heat scores of files based on low activity and a user-defined relative file importance value, e.g., a business value label. The technology described herein processes only a relevant fraction of files, in contrast to evaluating every file in the file system, and leaves headroom on tiers for incoming data. Optional, pluggable mathematical formulae for a decay style can be selected as a pattern for aging the heat scores based on lack of or relatively few new events.

Figure 9:
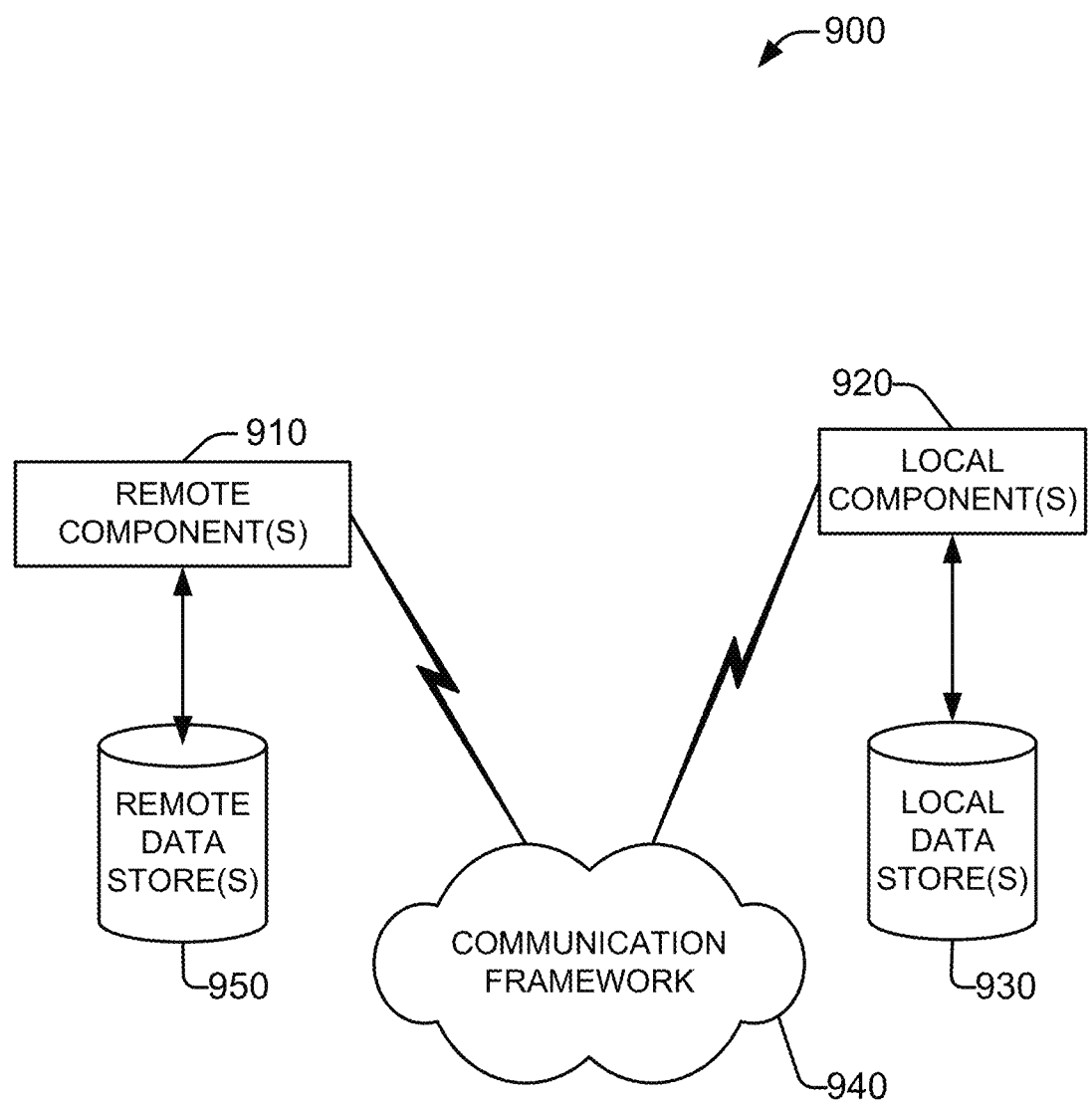
FIG. 9 is a block diagram representing an example computing environment into which aspects of the subject matter described herein may be incorporated.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise an automatic scaling component and/or programs that communicate/use the remote resources 910, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
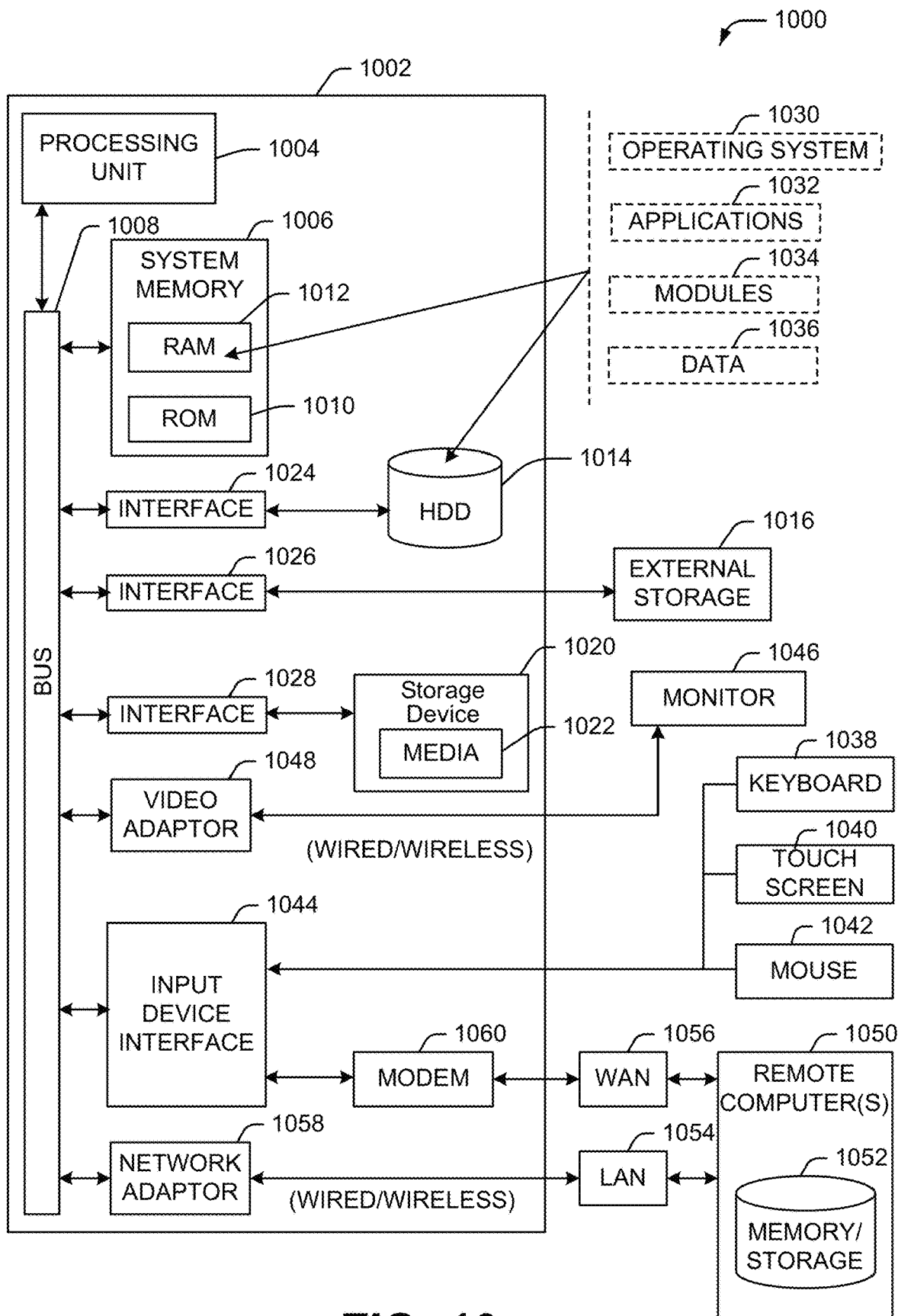
FIG. 10 depicts an example schematic block diagram of a computing environment with which the disclosed subject matter can interact/be implemented at least in part, in accordance with various aspects and implementations of the subject disclosure.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IOT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), and can include one or more external storage devices 1016 (e.g., a magnetic floppy disk drive (FDD) 1016, a memory stick or flash drive reader, a memory card reader, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014.

Other internal or external storage can include at least one other storage device 1020 with storage media 1022 (e.g., a solid state storage device, a nonvolatile memory device, and/or an optical disk drive that can read or write from removable media such as a CD-ROM disc, a DVD, a BD, etc.). The external storage 1016 can be facilitated by a network virtual machine. The HDD 1014, external storage device(s) 1016 and storage device (e.g., drive) 1020 can be connected to the system bus 1008 by an HDD interface 1024, an external storage interface 1026 and a drive interface 1028, respectively.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
at least one processor; and
at least one memory that stores executable instructions that, when executed by the at least one processor, facilitate performance of operations, the operations comprising:
maintaining respective heat scores for respective files of a dataset, comprising adjusting the respective heat scores based on respective activity levels of the respective files,
wherein the respective heat scores are based on respective amounts of file activity for the respective files of the dataset;
wherein the respective heat scores comprise first heat scores and second heat scores,
wherein the first heat scores are based on a parameter comprising a first amount of file activity corresponding to a first input-output operation type, a second amount of file activity corresponding to a second input-output operation type, or an overall amount of file activity corresponding to any input-output operation type, and
wherein the second heat scores are based on at least one different parameter than the first heat scores;

obtaining a relative importance level value, comprising a business value, of a computer system domain comprising the respective files,
wherein the adjusting of the respective heat scores comprises decaying, over a defined time window, the respective heat scores based on a combination of a time since last access of the respective files and the relative importance level value;
ordering the respective files based on the first heat scores;
based on the ordering, selecting a file from the respective files; and
based on the second heat scores, re-tiering comprising moving the file from a first tier of multitier storage to a second tier of the multitier storage based on the second heat scores.

2. The system of claim 1, wherein the re-tiering enables faster access to the file relative to the second tier.

3. The system of claim 1, wherein the time since last access of the respective files is a first time, wherein the adjusting of the respective heat scores further comprises determining respective input-output operations of the respective files over a time period relative to respective previous heat scores of the respective files, and
wherein the previous heat scores are based on a combination of a second time, previous to the first time, since previous last access of the respective files corresponding to the previous heat scores and based on previous respective relative importance level values corresponding to the previous heat scores.

4. The system of claim 1, wherein the adjusting of the respective heat scores further comprises determining at least one of: respective read operations corresponding to the respective files, respective write operations corresponding to the respective files, respective metadata access operations corresponding to the respective files, respective size data of respective input-output operations corresponding to the respective files, or respective latency data of the respective input-output operations.

5. The system of claim 1, wherein the operations further comprise, in response to the moving of the file, designating the file as ineligible for additional movement of the file among tiers of the multitier storage, comprising the first tier and the second tier, within a specified interval of time.

6. The system of claim 1, wherein the computer system domain is a filter domain comprising a user-entity specified arrangement of the respective files grouped other than by a hierarchical tiering, the respective heat scores, or another heat score.

7. The system of claim 1, wherein the maintaining of the respective heat scores further comprises raising the respective heat score of a file of the respective files based on a prediction, output by an analytical model, of a future input-output operation corresponding to the file.

8. The system of claim 7,
wherein the adjusting of the respective heat scores based on respective activity levels of the respective files comprises consuming event data corresponding to access to the respective files,
wherein the raising of the respective heat score of the file based on the prediction comprises generating, using the analytical model, the prediction based on access history for the file, and
wherein the generating of the prediction comprises inserting an event into an event stream, from which the event data is obtained, based on evaluating, using the analytical model, the access history for the file.

9. The system of claim 1, wherein the decaying of the respective heat scores over time comprises initially decaying the respective heat scores using a linear decay of the respective heat scores and subsequently decaying the respective heat scores using an exponential decay of the respective heat scores.

10. A method, comprising:
obtaining, by a system comprising at least one processor, respective file activity data comprising respective file access data, respective relative file value data and respective past access level data of a group of respective files;
determining by the system, based on the respective file activity data, respective heat scores for the respective files of the group, wherein the determining of the respective heat scores is based on a business value of a computer system domain comprising the group of respective files;
generating, by the system, a first projected storage tier utilization level of a first storage tier and a second projected storage tier utilization level of the second storage tier prior to the moving of the subgroup;
ordering, by the system, the respective files based on the respective heat scores,
wherein the ordering is further based on a defined acceptability level of results of the generating of the first projected storage tier utilization level and the second projected storage tier utilization level;
based on the ordering, selecting a subgroup of the respective files for re-tiering between storage tiers;
re-tiering, by the system, the subgroup from a first storage tier to a second storage tier,
wherein the re-tiering further comprises:
employing a machine learning model that uses a recognized access trend corresponding to the respective files of the subgroup to adjust the respective heat scores,
wherein the adjusting of the respective heat scores comprises generating, using the machine learning model, a prediction of a future input-output operation corresponding to the respective files of the subgroup based on an access history of the respective file activity data for the respective files, and
based on the prediction generated using the machine learning model, raising a respective heat score corresponding to the respective files, resulting in moving of the subgroup.

11. The method of claim 10, wherein the obtaining of the respective file activity data comprises tracking file-related operations.

12. The method of claim 10, wherein the obtaining of the respective file activity data comprises accessing a file operation log.

13. The method of claim 10, wherein the ordering of the respective files comprises storing respective file metadata in a B-tree comprising keys ordered by the respective heat scores.

14. The method of claim 10, further comprising:
decaying, by the system, over time, the respective heat scores based on the respective relative file value data,
wherein the decaying of the respective heat scores over time comprises decaying the respective heat scores based on a time since last access of the group of respective files corresponding to the respective heat scores, and
wherein the decaying of the respective heat scores over time further comprises initially decaying the respective heat scores using a linear decay of the respective heat scores and subsequently decaying the respective heat scores using an exponential decay of the respective heat scores.

15. The method of claim 14, wherein the respective relative file value data is based on a specified business value of a computer system domain comprising the at least one of the respective files.

16. The method of claim 10, wherein the subgroup is a first subgroup, and further comprising moving, by the system, a second subgroup of files from the second storage tier to the first storage tier at least partially in parallel with the moving of the first subgroup from the first storage tier to the second storage tier.

17. The method of claim 10,
wherein the obtaining of the respective file activity data comprises consuming event data corresponding to access to the group of respective files, and
wherein the generating of the prediction comprises inserting an event into an event stream, from which the event data is obtained, based on evaluating, using the analytical model, the access history for the respective files of the subgroup.

18. A non-transitory machine-readable medium, comprising executable instructions that, when executed by at least one processor, facilitate performance of operations, the operations comprising:
determining a first subgroup of files maintained on a first tier of storage based on first heat score levels that are lower than second heat score levels of first other files maintained on the first tier of storage other than the first subgroup of files;
determining a second subgroup of files maintained on a second tier of storage based on third heat score levels that are higher than fourth heat score levels of second other files maintained on the second tier of storage other than the second subgroup of files,
wherein the first heat score levels, second heat score levels, third heat score levels and fourth heat score levels are determined based on business values of respective computer system domains respectively comprising the first tier of storage and the second tier of storage;
prior to the determining of at least one of the first subgroup of files or of the second subgroup of files, employing an artificial intelligence process that uses a recognized access trend corresponding to at least one file of the first subgroup of files or of the second subgroup of files to adjust respective heat score levels of the at least one file of the first subgroup of files or of the second subgroup of files,
wherein the adjusting of the respective heat score levels comprises generating a prediction, by the artificial intelligence process, of a future input-output operation corresponding to the at least one of the files of the first subgroup of files or of the second subgroup of files based on the recognized access trend corresponding to the at least one of the files of the first subgroup of files or of the second subgroup of files, and
based on the employing, raising a heat score level of the first heat score levels or the third heat score levels, resulting in the determining of the first subgroup of files or the determining of the second subgroup of files;
moving the first subgroup of files from the first tier of storage to the second tier of storage;
moving the second subgroup of files from the second tier of storage to the first tier of storage; and
in response to the moving of the first subgroup of files from the first tier of storage to the second tier of storage, designating at least one file of the first subgroup of files as ineligible, during a specified time interval, for being again moved among tiers of the storage, comprising the first tier and second tier.

19. The non-transitory machine-readable medium of claim 18, wherein the designating of the at least one file of the first subgroup of files as ineligible, during a specified time interval, applies to movement of the at least one file from the second tier of storage back to the first tier of storage.

20. The non-transitory machine-readable medium of claim 18,
wherein the generating of the prediction comprises inserting an event into an event stream from which the recognized access trend is determined by the artificial intelligence process, and
wherein the event corresponds to the at least one of the files of the first subgroup of files or of the second subgroup of files.

* * * * *